United States Patent
Prus et al.

(10) Patent No.: US 8,208,796 B2
(45) Date of Patent: Jun. 26, 2012

(54) SYSTEMS AND METHODS FOR PRIORITIZING THE STORAGE LOCATION OF MEDIA DATA

(76) Inventors: Bohdan S. Prus, Alpharetta, GA (US); Samuel H. Russ, Lawrenceville, GA (US)

(*) Notice: Subject to any disclaimer, the term of this patent is extended or adjusted under 35 U.S.C. 154(b) by 1441 days.

(21) Appl. No.: 11/405,205

(22) Filed: Apr. 17, 2006

(65) Prior Publication Data

US 2007/0245024 A1 Oct. 18, 2007

(51) Int. Cl.
- H04N 5/76 (2006.01)
- G06F 12/06 (2006.01)
- G06F 13/00 (2006.01)
- G06F 13/28 (2006.01)

(52) U.S. Cl. ........ 386/291; 386/292; 386/293; 386/294; 386/295; 711/5; 711/100; 711/112; 711/114

(58) Field of Classification Search ................ 386/1, 46, 386/83, 95, 291, 292, 293, 294, 295; 725/58; 711/5, 100, 112, 114

See application file for complete search history.

(56) References Cited

U.S. PATENT DOCUMENTS

| | | |
|---|---|---|
| 5,742,677 A | 4/1998 | Pinder et al. |
| 5,742,686 A | 4/1998 | Finley |
| 5,796,829 A | 8/1998 | Newby et al. |
| 5,856,975 A | 1/1999 | Rostoker et al. |
| 5,870,474 A | 2/1999 | Wasilewski et al. |
| 5,872,846 A | 2/1999 | Ichikawa |
| 5,905,522 A | 5/1999 | Lawler |
| 5,915,068 A | 6/1999 | Levine |
| 5,917,822 A | 6/1999 | Lyles et al. |
| 5,933,503 A | 8/1999 | Schell et al. |
| 5,940,391 A | 8/1999 | Malkin et al. |
| 5,943,047 A | 8/1999 | Suzuki |
| 5,961,603 A | 10/1999 | Kunkel et al. |
| 5,987,572 A | 11/1999 | Weidner et al. |
| 5,990,881 A | 11/1999 | Inoue et al. |
| 5,990,927 A | 11/1999 | Hendricks et al. |
| 5,999,970 A | 12/1999 | Krisbergh et al. |
| 6,005,938 A | 12/1999 | Banker et al. |
| 6,006,257 A | 12/1999 | Slezak |
| 6,020,982 A | 2/2000 | Yamauchi et al. |
| 6,035,281 A | 3/2000 | Crosskey et al. |

(Continued)

FOREIGN PATENT DOCUMENTS

EP 0 782 296 7/1997

(Continued)

OTHER PUBLICATIONS

International Search Report and Written Opinion dated Mar. 10, 2008 cited in PCT/US20071071841.

(Continued)

Primary Examiner — Daquan Zhao
(74) Attorney, Agent, or Firm — Merchant & Gould

(57) ABSTRACT

A digital media recorder includes a first storage device associated with the digital media recorder and an interface for removably attaching a second storage device to the digital media recorder. Each of the first and second storage devices are configured to store media data representing programming from a media source. The digital media recorder is configured with logic for prioritizing the storage of the media data to one of the first and second storage devices before storing the media data to the other of the first and second storage devices.

29 Claims, 5 Drawing Sheets

U.S. PATENT DOCUMENTS

| | | | |
|---|---|---|---|
| 6,057,872 A | 5/2000 | Candelore | |
| 6,088,455 A | 7/2000 | Logan et al. | |
| 6,098,056 A | 8/2000 | Rusnak et al. | |
| 6,105,134 A | 8/2000 | Pinder et al. | |
| 6,108,002 A | 8/2000 | Ishizaki | |
| 6,118,976 A | 9/2000 | Arias et al. | |
| 6,154,817 A * | 11/2000 | Mohan et al. | 711/162 |
| 6,157,377 A | 12/2000 | Shah-Nazaroff et al. | |
| 6,157,719 A | 12/2000 | Wasilewski et al. | |
| 6,173,400 B1 | 1/2001 | Perlman et al. | |
| 6,185,625 B1 | 2/2001 | Tso et al. | |
| 6,229,895 B1 | 5/2001 | Son et al. | |
| 6,230,269 B1 | 5/2001 | Spies et al. | |
| 6,246,767 B1 | 6/2001 | Akins, III et al. | |
| 6,252,964 B1 | 6/2001 | Wasilewski et al. | |
| 6,253,375 B1 | 6/2001 | Gordon et al. | |
| 6,292,568 B1 | 9/2001 | Akins, III et al. | |
| 6,305,020 B1 | 10/2001 | Hoarty et al. | |
| 6,345,307 B1 | 2/2002 | Booth | |
| 6,356,971 B1 | 3/2002 | Katz et al. | |
| 6,366,987 B1 | 4/2002 | Tzelnic et al. | |
| 6,378,130 B1 | 4/2002 | Adams | |
| 6,401,243 B1 | 6/2002 | Suzuki | |
| 6,424,714 B1 | 7/2002 | Wasilewski et al. | |
| 6,424,717 B1 | 7/2002 | Pinder et al. | |
| 6,459,427 B1 | 10/2002 | Mao et al. | |
| 6,484,318 B1 | 11/2002 | Shioda et al. | |
| 6,510,519 B2 | 1/2003 | Wasilewski et al. | |
| 6,516,412 B2 | 2/2003 | Wasilewski et al. | |
| 6,526,508 B2 | 2/2003 | Akins, III et al. | |
| 6,532,593 B1 | 3/2003 | Moroney | |
| 6,543,053 B1 | 4/2003 | Li et al. | |
| 6,549,577 B2 | 4/2003 | Florencio et al. | |
| 6,550,008 B1 | 4/2003 | Zhang et al. | |
| 6,560,340 B1 | 5/2003 | Akins, III et al. | |
| 6,574,609 B1 | 6/2003 | Downs et al. | |
| 6,636,953 B2 | 10/2003 | Yuasa et al. | |
| 6,727,944 B1 | 4/2004 | Adachi | |
| 6,744,892 B2 | 6/2004 | Akins, III et al. | |
| 6,748,080 B2 | 6/2004 | Russ et al. | |
| 6,804,357 B1 | 10/2004 | Ikonen et al. | |
| 6,937,729 B2 | 8/2005 | Akins, III et al. | |
| 6,963,972 B1 | 11/2005 | Chang et al. | |
| 6,971,008 B2 | 11/2005 | Wasilewski et al. | |
| 7,062,658 B1 | 6/2006 | Cheriton et al. | |
| 7,065,216 B1 | 6/2006 | Benaloh et al. | |
| 7,089,579 B1 | 8/2006 | Mao et al. | |
| 7,107,416 B2 | 9/2006 | Stuart et al. | |
| 7,146,388 B2 | 12/2006 | Stakutis et al. | |
| 7,155,609 B2 | 12/2006 | Chan et al. | |
| 7,181,010 B2 | 2/2007 | Russ et al. | |
| 7,200,868 B2 | 4/2007 | Mattox et al. | |
| 7,212,725 B2 * | 5/2007 | Gunji et al. | 386/46 |
| 7,233,959 B2 | 6/2007 | Kanellos et al. | |
| 7,363,326 B2 | 4/2008 | Margolus | |
| 7,505,592 B2 | 3/2009 | Russ et al. | |
| 7,602,913 B2 | 10/2009 | Wasilewski | |
| 7,602,914 B2 | 10/2009 | Wasilewski | |
| 7,630,499 B2 | 12/2009 | Wasilewski | |
| 7,650,442 B2 * | 1/2010 | Ashley et al. | 710/31 |
| 7,860,250 B2 | 12/2010 | Russ et al. | |
| 7,861,082 B2 | 12/2010 | Pinder et al. | |
| 7,978,720 B2 | 7/2011 | Russ et al. | |
| 2001/0006400 A1 | 7/2001 | Kubo et al. | |
| 2001/0049824 A1 | 12/2001 | Baker et al. | |
| 2002/0013772 A1 | 1/2002 | Peinado | |
| 2002/0018130 A1 | 2/2002 | Suemoto et al. | |
| 2002/0026582 A1 | 2/2002 | Futamura et al. | |
| 2002/0044658 A1 | 4/2002 | Wasilewski et al. | |
| 2002/0094084 A1 | 7/2002 | Wasilewski et al. | |
| 2002/0099663 A1 | 7/2002 | Yoshino et al. | |
| 2002/0116708 A1 | 8/2002 | Morris et al. | |
| 2002/0144067 A1 | 10/2002 | Jeong | |
| 2002/0146237 A1 | 10/2002 | Safadi | |
| 2002/0184457 A1 | 12/2002 | Yuasa et al. | |
| 2002/0199190 A1 | 12/2002 | Su | |
| 2003/0005446 A1 | 1/2003 | Jaff et al. | |
| 2003/0005454 A1 | 1/2003 | Rodriguez et al. | |
| 2003/0009668 A1 | 1/2003 | Chan | |
| 2003/0028890 A1 | 2/2003 | Swart | |
| 2003/0093680 A1 | 5/2003 | Astley et al. | |
| 2003/0110234 A1 | 6/2003 | Egli et al. | |
| 2003/0161617 A1 | 8/2003 | Um et al. | |
| 2003/0188164 A1 | 10/2003 | Okimoto et al. | |
| 2003/0200337 A1 | 10/2003 | Jabri et al. | |
| 2004/0039911 A1 | 2/2004 | Oka et al. | |
| 2004/0045030 A1 | 3/2004 | Reynolds et al. | |
| 2004/0052377 A1 | 3/2004 | Mattox et al. | |
| 2004/0068739 A1 | 4/2004 | Russ et al. | |
| 2004/0088328 A1 | 5/2004 | Cook et al. | |
| 2004/0117831 A1 | 6/2004 | Ellis et al. | |
| 2004/0123313 A1 | 6/2004 | Koo et al. | |
| 2004/0128499 A1 | 7/2004 | Peterka et al. | |
| 2004/0187014 A1 | 9/2004 | Molaro | |
| 2004/0193921 A1 | 9/2004 | Byrne | |
| 2004/0236804 A1 | 11/2004 | Bots et al. | |
| 2004/0237100 A1 | 11/2004 | Pinder | |
| 2005/0076066 A1 | 4/2005 | Stakutis et al. | |
| 2005/0080497 A1 | 4/2005 | Rao | |
| 2005/0091173 A1 | 4/2005 | Alve | |
| 2005/0100162 A1 | 5/2005 | Alve et al. | |
| 2005/0102513 A1 | 5/2005 | Alve | |
| 2005/0111835 A1 | 5/2005 | Friel et al. | |
| 2005/0169467 A1 | 8/2005 | Risan et al. | |
| 2005/0223414 A1 | 10/2005 | Kenrich et al. | |
| 2005/0232593 A1 * | 10/2005 | Kanai | 386/94 |
| 2005/0237396 A1 | 10/2005 | Hagiwara et al. | |
| 2005/0240708 A1 | 10/2005 | Shaver et al. | |
| 2006/0013566 A1 * | 1/2006 | Nakamura | 386/97 |
| 2006/0020786 A1 | 1/2006 | Helms et al. | |
| 2006/0039256 A1 | 2/2006 | Nakamura et al. | |
| 2006/0039559 A1 | 2/2006 | Wasilewski | |
| 2006/0039560 A1 | 2/2006 | Wasilewski | |
| 2006/0041905 A1 | 2/2006 | Wasilewski | |
| 2006/0072752 A1 | 4/2006 | Nakano et al. | |
| 2006/0074807 A1 | 4/2006 | Gauba et al. | |
| 2006/0109854 A1 | 5/2006 | Cancel | |
| 2006/0156382 A1 | 7/2006 | Motoyama | |
| 2006/0179478 A1 | 8/2006 | Han et al. | |
| 2006/0184733 A1 * | 8/2006 | Yamamoto et al. | 711/114 |
| 2006/0200865 A1 | 9/2006 | Leake et al. | |
| 2007/0055390 A1 | 3/2007 | Simon et al. | |
| 2007/0130254 A1 | 6/2007 | Russ et al. | |
| 2007/0277205 A1 | 11/2007 | Grannan | |
| 2009/0089369 A1 | 4/2009 | Russ et al. | |

FOREIGN PATENT DOCUMENTS

| | | |
|---|---|---|
| EP | 1 014 715 | 6/2000 |
| EP | 1 213 919 | 12/2002 |
| FR | 2 779 599 | 12/1999 |
| GB | 2 403 586 A | 1/2005 |
| KR | 10-2003-0037098 | 5/2003 |
| KR | 10-2004-0062662 | 7/2004 |
| WO | WO 00/11840 | 3/2000 |
| WO | WO 00/51041 | 8/2000 |
| WO | WO 01/18807 | 3/2001 |
| WO | WO 01/75876 | 10/2001 |
| WO | WO 01/82588 | 11/2001 |
| WO | WO 02/97997 | 12/2002 |
| WO | WO 2004/098190 | 11/2004 |
| WO | WO 2005/029843 | 3/2005 |
| WO | WO 2005/029852 | 3/2005 |
| WO | WO 2005/091626 | 9/2005 |
| WO | WO 2005/101411 | 10/2005 |
| WO | WO 2006/038204 | 4/2006 |
| WO | 2006066052 A2 | 6/2006 |
| WO | WO 2008/005699 | 1/2008 |
| WO | WO 2008/005700 | 1/2008 |

OTHER PUBLICATIONS

"Explorer 8300 Series Digital Recorder" ScientificAtlanta.com [online] Oct. 2005, XP002459851, Retrieved from the internet: URL:http://www.cisco.com/application/pdf/en/us/guest/products/ps8613/c1650/cdccont_0900aecd806c6913.pdf [retrieved on Nov. 22, 2007].

Gilo: "Do It Yourself Making an External Hard Drive Guide" Notebookreview.com,[online], Jun. 2, 2006, XP002459852, Retrieved from the internet:URL:http://www.notebookreview.com/default.asp?newsID=2972 [retrieved on Nov. 22, 2007].

U.S. Appl. No. 10/873,805, filed Jun. 22, 2004, Entitled "Validating Client Receivers,"Inventors: Pinder et al.

U.S. Appl. No. 10/920,926, filed Aug. 18, 2004, Entitled "Retrieval and Transfer of Encrypted Hard Drive Content from Digital Video Receiver Set Top Box," Inventor: Wasilewski, Anthony.

U.S. Appl. No. 10/920,841, filed Aug. 18, 2004, Entitled "Retrieval and Transfer of Encrypated Hard Drive Content from Digital Video Receiver Set Top Box Utilizing Second Digital Video Receiver Set Top Box," Inventor: Wasilewski, Anthony.

U.S. Appl. No. 10/920,842, filed Aug. 18, 2004, Entitled "Utilization of Encrypted Hard Drive Content by One Digital Video Receiver Set Top Box when Recorded by Another," Inventor: Wasilewski, Anthony.

U.S. Appl. No. 11/428,367, filed Jun. 30, 2006, Entitled "Secure Escrow and Recovery of Media Device Content Keys," Inventors: Schlarb et al.

U.S. Appl. No. 11/454,421, filed Jun. 16, 2006, Entitled "Securing Media Content Using Interchangeable Encryption Key," Inventors: Pinder et al.

U.S. Appl. No. 11/428,362, filed Jun. 30, 2006, Entitled "System and Method for Managing Media Data," Inventors: Prus et al.

U.S. Appl. No. 11/428,356, filed Jun. 30, 2006, Entitled "System and Method for Applying Retention Rules," Inventors: Prus et al.

U.S. Appl. No. 11/428,357, filed Jun. 30, 2006, Entitled "Digital Media Device having Selectable Media Content Storage Locations," Inventors: Prus et al.

U.S. Appl. No. 11/428,365, filed Jun. 30, 2006, Entitled "Digital Media Device having Media Content Transfer Capability," Inventors: Russ et al.

U.S. Appl. No. 11/671,506, filed Feb. 6, 2007, Entitled "Apparatus for Entitling and Transmitting Service Instances to Remote Client Devices," Inventors: Russ et al.

US U.S. Appl. No. 11/942,778, filed Nov. 20, 2007, Entitled "Retrieval and Transfer of Encrypted Hard Drive Content from Digital Video Receiver Set Top Box to a Content Transcription Device," Inventor: Wasilewski, Anthony.

Canadian Office Action mailed Jun. 13, 2011 cited in Application No. 2,655,536.

Canadian Office Action mailed Jun. 13, 2011 cited in Application No. 2,655,526.

European Decision to Refuse dated Jul. 26, 2011 cited in Application No. 07 815 092.7-1245.

Korean Notice of Final Rejection dated Jul. 28, 2011 cited in Application No. 10-2008-7030549.

Canadian Office Action mailed Jan. 12, 2011 in Application No. 2,571,533.

Canadian Office Action mailed Feb. 2, 2011 in Application No. 2,652,745.

European Office Action dated Apr. 4, 2011 in Application No. 07 815 092.7.

European Office Action dated Apr. 21, 2011 in Application No. 07 798 909.3.

Allway Sync (Allway Sync 3.2.2), Dec. 6, 2005, pp. 1-14.

Barton "TiVO—Lution: The Challenges of delivery a reliable, easy-to-use DVR service to the masses" ACM QUEUE Apr. 2006 35 more queue: www.acmqueue.com Blackcurrant, ("Delete Files Across a Network"), May 11, 2005; accessed Jul. 2, 2010 at http://techrepublic.com.com/5208-6230-0.html?forumID3&threadID=173478&start=0; 3 pgs.

Boston College, "Copying Files to a USB Drive or External Hard Drive," Nov. 8, 2005, pp. 1-5 http://web.archive.org/web/20060227003853/http://www.bc.edu/offices/help/met-elements/doc/articles/html/HW-usb-drive-copy.shtml.

Chorianopoulous et al. "Affective Usability Evaluation for an Interactive Music Television Channel"ACM Computers in Entertainment, vol. 2, No. 3, Jul. 2004, Article 7b.

Dybwad, B.; ("TiVo 7.2 OS Adds Red Flag Content Protection Feature"), Sep. 14, 2005, pp. 1-5, http://www. engadget.com/2005/09/14/tivo-7-2-os-adds-red-flag-content-protection-feature/.

Ellison, "TiVo Series 2", Jan. 13, 2004, pp. 1-6, http://www.pcmag.com/article2/8,2817,1649659,00.asp.

Eskicioglu et al. "An overview of multimedia content protection in consumer electronics devices," Signal Processing. Image Communication, Elsevier Science Publishers, Ambsterdam, NL, vol. 16, No. 7, Apr. 2001, pp. 681-699, XP004232133 ISSN: 0923-5965.

Haughey, M.; ("PC to TiVo Playback Released"), Oct. 24, 2005, pp. 1-13 http://web.archive.org/web/20051024002825/http://www.pvrblog.com/pvr/2005/08/pc_to_tivo_play.html.

Haughey, M.; ("TiVo 7.2 OS Adds Content Protection, Blocks Transfers, and Auto-Deletes Some Shows"), Sep. 13, 2005, pp. 1-14, http://www.pvrblog.com/pvr/2005/09/tivo_72_os_adds.html.

Menezes, et al.; "Handbook of Applied Cryptography" Handbook of applied Cryptography, CRC Press Series on Discrete Mathematics and Its Application, Boca Raton, FL CRC PRess, 1997, pp. 546, 567-550, XP002356116 ISBN: 0-8493-8523-7.

Old Apps, ("Old Version of WinSCP"), Jan. 13, 2003, pp. 1-3; accessed Jul. 2, 2010 at http://www.oldapps.com/WinSCP.php?old_winscp=2; 3 pgs.

Picker, "The Digital Video Recorder: Unbundling Advertising and Content" Professor of Commercial Law, The University of Chicago Law School, Senior Fellow, The Computation Institute of the University of Chicago and Argonne National Laboratory; Sep. 10, 2003.

Smith, J.; "Files and Folders: Removable Media," Oct. 13, 2004, pp. 1-12 http://web.archive.org/web/20041027194919/http://www.jegsworks.com/Lessons/win/filesandfolders/step-removabledisk.htm.

TiVo.com "What is TiVo?", Jan. 14, 2005, pp. 1-12; http://web.archive.org/web/20050114053806/http://www.tivo.com/1.0.asp.

WinFtp, Sep. 8, 2005, pp. 1-7 http://download.cnet.com/WinFtp-Client/3000-2160_4-10429297.html.

Wurmlin et al. "3D Video Record" Proceedings of the 10th Pacific Conference on Computer Graphics and Applications (PG'02) IEEE Computer Society.

International Search Report dated Oct. 22, 2003 in PCT/US2003/016585.

International Search Report and Written Opinion dated Jun. 7, 2006, cited in PCT/US2005/022069.

International Search Report and Written Opinion dated Dec. 21, 2007, cited in PCT/US2007/071842.

International Search Report cited in PCT/US2007/071843 mailed Dec. 27, 2007.

Supplemental European Search Report dated Jan. 24, 2008, in Application No. 03 755 496.01.

International Search Report dated Jan. 31, 2008, in PCT/US2007/070680.

European Office Action mailed Jul. 24, 2008 in Application No. 03 755 496.1.

International Preliminary Report mailed Jan. 6, 2009, in PCT/US2007/072328.

European Office Action mailed Feb. 10, 2009, in Application No. 07798909.3.

European Office Action mailed Feb. 11, 2009, in Application No. 07798908.5.

European Office Action mailed Feb. 18, 2009, in Application No. 07 798 909.3.

European Office Action mailed Mar. 16, 2009, in Application No. 07 781 952.2.

European Office Action mailed Apr. 29, 2009 in Application No. 07 784 510.5.

European Office Action mailed Apr. 29, 2009 in Application No. 07 798 908.5.

European Office Action mailed May 7, 2009 in Application No. 07 840 308.6.

European Office Action mailed May 11, 2009 in Application No. 05 766 482.3.

European Office Action mailed Jun. 9, 2009 in Application No. 07 815 092.7.

Australian Office Action mailed Aug. 4, 2009 in Application 2005258137.

Canadian Office Action mailed Aug. 19, 2009 in Application 2,571,533.

Notice of Preliminary Rejection dated May 28, 2010, cited in KR Appl. No. 10-2008-7031848, 7 pgs.
European Office Action mailed Sep. 9, 2010 in Application No. 07 840 308.6.
Notice of Preliminary Rejection dated Sep. 18, 2010 cited in Korean Application No. 10-2008-7032127.
Notice of Preliminary Rejection dated Oct. 25, 2010 cited in Korean Application No. 10-2008-7030549.
Notice of Final Rejection dated Nov. 26, 2010 cited in Korean Application No. 10-2008-7031848.
Office Action mailed Aug. 20, 2007, in U.S. Appl. No. 10/873,805.
Office Action mailed Jan. 9, 2008, in U.S. Appl. No. 10/873,805.
Office Action mailed Apr. 30, 2008, in U.S. Appl. No. 11/482,356.
Office Action mailed Jul. 9, 2008, in U.S. Appl. No. 10/873,805.
Office Action mailed Aug. 5, 2008, in U.S. Appl. No. 11/428,357.
Office Action mailed Sep. 30, 2008, in U.S. Appl. No. 11/428,362.
Office Action mailed Nov. 28, 2008, in U.S. Appl. No. 11/482,356.
Office Action mailed Dec. 12, 2008, in U.S. Appl. No. 11/428,365.
Office Action mailed Dec. 17, 2008, in U.S. Appl. No. 10/873,805.
Office Action mailed Mar. 18, 2009, in U.S. Appl. No. 11/428,362.
Office Action mailed Apr. 2, 2009, in U.S. Appl. No. 11/428,357.
Office Action mailed May 28, 2009, in U.S. Appl. No. 11/428,365.
Office Action mailed Jul. 22, 2009, in U.S. Appl. No. 11/428,357.
Office Action mailed Aug. 4, 2009, in U.S. Appl. No. 11/428,356.
Office Action mailed Aug. 7, 2009, in U.S. Appl. No. 11/428,362.
Office Action mailed Sep. 22, 2009, in U.S. Appl. No. 11/454,421.
Office Action mailed Oct. 7, 2009, in U.S. Appl. No. 11/428,367.
Office Action mailed Oct. 26, 2009, in U.S. Appl. No. 11/428,365.
Office Action mailed Oct. 28, 2009, in U.S. Appl. No. 11/942,778.
Office Action mailed Dec. 9, 2009, in U.S. Appl. No. 11/428,357.
Office Action mailed Jan. 14, 2010, in U.S. Appl. No. 11/428,362.
Office Action mailed Feb. 1, 2010, in U.S. Appl. No. 11/428,356.
Office Action mailed Feb. 24, 2010, in U.S. Appl. No. 12/327,157.
Office Action mailed Apr. 13, 2010, in U.S. Appl. No. 11/454,421.
Office Action mailed Apr. 14, 2010, in U.S. Appl. No. 11/428,367.
Office Action mailed May 5, 2010, in U.S. Appl. No. 11/428,365.
Office Action mailed May 11, 2010, in U.S. Appl. No. 11/428,357.
Office Action mailed May 26, 2010, in U.S. Appl.No. 11/428,362.
Office Action mailed Oct. 14, 2010 in U.S. Appl. No. 11/428,365.
Office Action mailed Oct. 26, 2010 in U.S. Appl. No. 11/428,357.
Office Action mailed Nov. 2, 2010 in U.S. Appl. No. 11/428,362.
Canadian Office Action dated Aug. 24, 2011 cited in Appl. No. 2,655,114.
Canadian Office Action dated Aug. 29, 2011 cited in Appl. No. 2,655,530.
Canadian Office Action dated Sep. 2, 2011 cited in Application No. 2,652,745.
European Office Action dated Dec. 22, 2011 cited in Appl. No. 11169374.3, 9 pgs.
European Office Action dated Jan. 18, 2012 cited in Appl. No. 07 781 952.2, 5 pgs.
Canadian Office Action dated Sep. 21, 2011 cited in Appl. No. 2,655,677.
Canadian Office Action dated Sep. 21, 2011 cited in Appl. No. 2,655,531.

* cited by examiner

SYSTEMS AND METHODS FOR PRIORITIZING THE STORAGE LOCATION OF MEDIA DATA

BACKGROUND

1. Technical Field

The present disclosure generally relates to digital recording devices, and more specifically, the storage location of media data associated with a digital media recording device.

2. Description of the Related Art

Digital recording devices can be used for recording media signals, such as audio and/or video signals, in a digital format. Such devices may also be used for the storage and playback of such signals. One specific example of such a digital media recording device may be referred to as Digital Video Recorder (DVR) or Personal Video Recorder (PVR).

In general, a DVR may be used to schedule and record future television programs, for buffering live television programs in a time-shift buffer, and/or playback of the digitally recorded media. The incoming media signals may be received, potentially decrypted and/or encoded, and digitally stored on a storage medium. The storage medium is commonly a non-volatile storage device such as a hard disk drive (HDD) (i.e. hard drive), among other acceptable mediums. Such an HDD can write the digital media data on a magnetic surface of the HDD disk platters and read the media data at later times for playback.

Conventional DVRs include an HDD located inside the housing of the DVR for storing the media data. However, because of the heavy processing power used with DVRs, in addition to the heat generated from the internal HDDs, the environment inside of the enclosure can become very hot, especially under heavy use of the DVR. Further, in the event of an HDD failure, it can be very difficult to replace the HDD. In some cases, such replacement may be impossible to perform by an end user without voiding the manufacturer warranty. Such an issue is exacerbated by the aforementioned heat problems, which can cause premature failure of electronic devices, such as the HDD.

Although conventional DVRs include an HDD located inside the housing of the DVR for storing the media data, other DVRs, such as the Explorer 8300 model available from Scientific-Atlanta, Inc., include the capability of attaching an external HDD to the DVR through a high-speed communications bus. However, despite having both an internal and external drive, the heat buildup within the enclosure and the issues of premature failure remain.

Furthermore, although the external HDD may provide a user with additional storage space, some users may cause the external HDD to be powered off or otherwise unavailable at times. However, such activity can pose problems if a user would like to watch programming recorded on the external device at a time when the external HDD is not available to the DVR.

Accordingly, it is desirable to provide a media recording device that can be configured to mitigate these potential deficiencies, among others.

BRIEF DESCRIPTION OF THE DRAWINGS

The components in the drawings are not necessarily to scale relative to each other. Like reference numerals designate corresponding parts throughout the several views.

DETAILED DESCRIPTION

Figure 1:
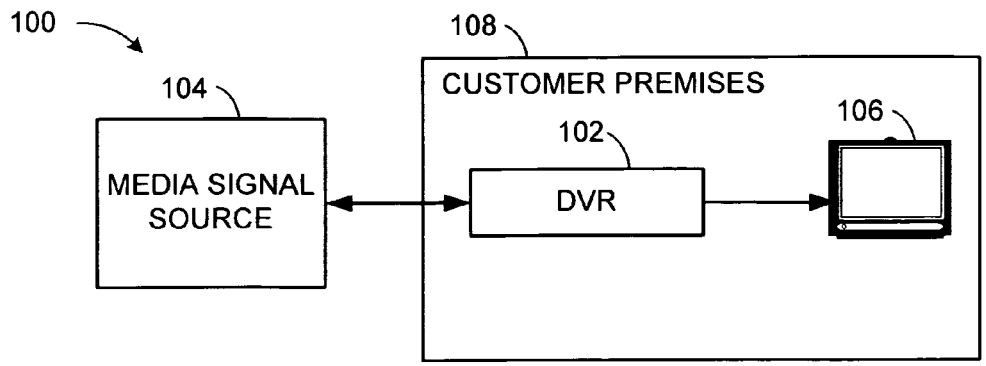
FIG. 1 depicts a block diagram of an arrangement of a digital video recorder (DVR) in accordance with embodiments of the present disclosure.

FIG. 1 depicts an embodiment of an arrangement 100 of a digital media recorder in accordance with embodiments of the present disclosure. According to embodiments described herein, the digital media recorder can be a digital video recorder (DVR) 102, which can be configured to record video and/or audio. However, according to some embodiments, the digital media recorder could be, among other devices used for recording digital media, a personal video recorder (PVR), a personal digital recorder (PDR), or could be a personal computer, laptop computer, personal digital assistant (PDA) configured to execute media recording capabilities.

DVR 102 could be, for example, an Explorer 8300 model available from Scientific-Atlanta, Inc., as modified by the teachings included herein, or any other device capable of recording media signals. According to some embodiments, DVR 102 may also be embedded within, or otherwise associated with, other electronic devices such as a cable television set-top box (STB), a tuner, a television, and/or a satellite-television receiver, among others. DVR 102 can be configured to receive media signals from a media signal source 104, and may also be in communication with a playback device, such as television 106. The playback device could also be a computer display, portable device, audio receiver, among other devices capable of emitting or displaying media.

Media signal source 104 could be, but is not limited to, a satellite television source, an over-the-air broadcast source, a cable-television (CATV) system, or could be a provider of signals received over a network (i.e. LAN, WAN, Internet, etc.) from a remote source. Thus, it can be appreciated that media signal source 104 could be any of a number of sources of analog or digital media signals, such as video and/or audio signals. Media signal source 104 can also transmit additional network data, including Internet traffic, teletext, closed-captioning, programming guide information, among others. Media signal source 104 can transmit such signals to DVR 102, which may be located at a customer premises 108. Although only one media signal source is depicted, it can be appreciated that DVR 102 could also accept media signals from more than one media signal source. For example, DVR 102 may receive signals from a CATV system as well as an over-the-air antenna.

Television 106 can, for example, receive and emit signals from DVR 102 representing the recorded media signals. For example, television 106 may be capable of emitting the recorded audio and video signals. Television 106 may also be used for displaying any windows associated with a graphical user interface generated by DVR 102.

Figure 2:
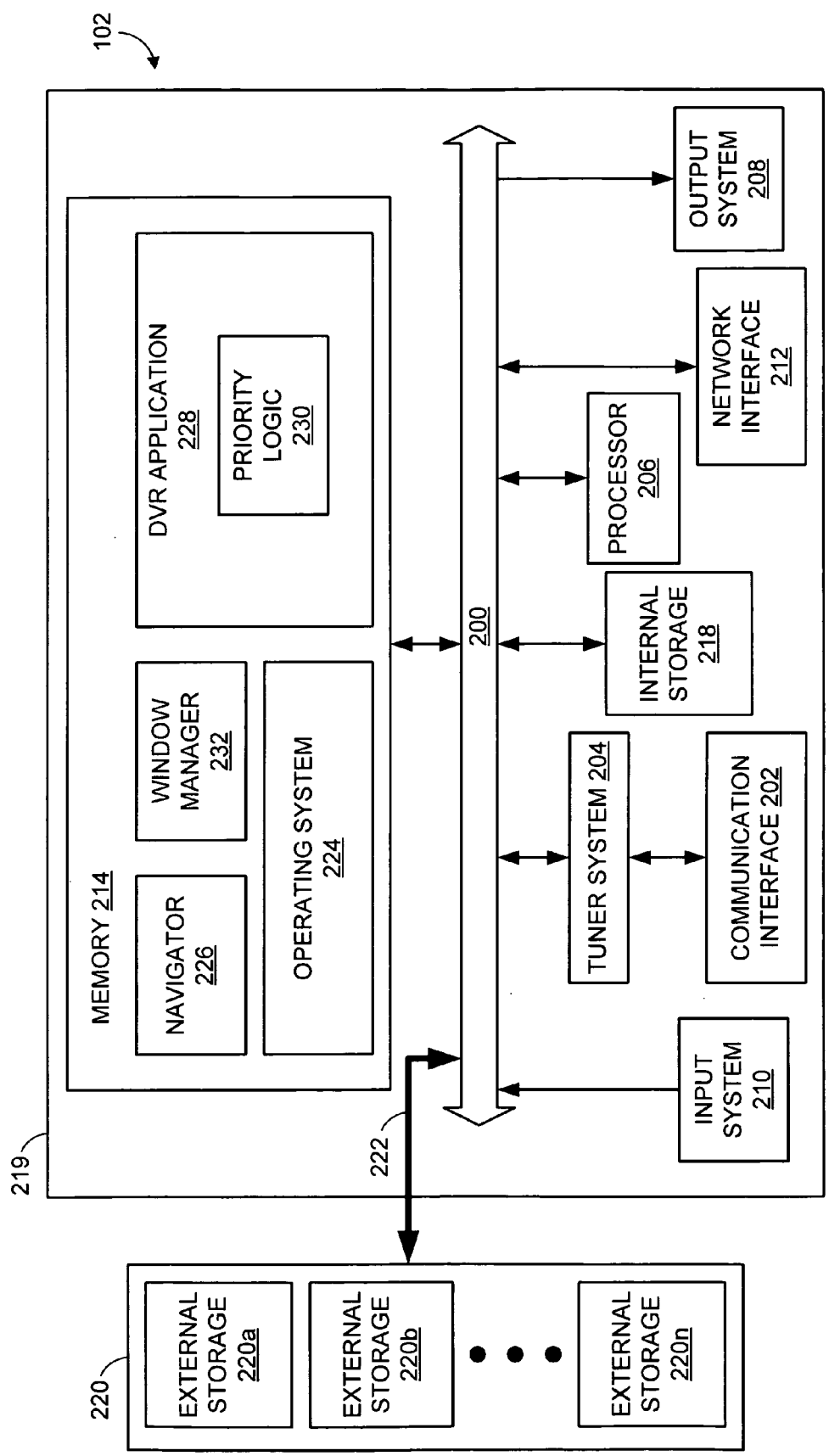
FIG. 2 depicts a block diagram of selected system components of an exemplary embodiment of the DVR of FIG. 1.

FIG. 2 is a block diagram depicting selected system components of an exemplary embodiment of the DVR 102 of FIG. 1. Omitted from FIG. 2 are a number of conventional components, known to those skilled in the art, that are unnecessary to explain the operation of the disclosed systems and methods for prioritizing the storage location of media data. Media data represents digitally encoded media content (i.e. audio signals, video signals, etc.). Media content may also be referred to herein as media programs or media programming.

FIG. 2 depicts several components commonly communicating through a local bus 200. For example, DVR 102 may include a communications interface 202 for receiving video, audio and other media signals from media signal source 104 (FIG. 1). DVR 102 may also include a tuner system 204 which could include, for example, a tuner for receiving and selecting one or more selected channels of media signals. For example, tuner system 204 can tune to a particular television station, and the media signals associated with this station can be recorded by the DVR 102.

DVR 102 can further include at least one processor 206 for controlling the operations of the DVR 102 and an output system 208 for driving a playback device (e.g., television 106). An input system 210 can receive user inputs provided via a wired or wireless input device such as, for example, a hand-held remote control, a transmitter with buttons or keys located on the exterior of the DVR, and/or a keyboard.

Network interface 212 can transmit and/or receive data over a network such as a LAN, WAN, or the Internet. For example, data may be transferred to/from another DVR, a media signal source, or a centralized server through network interface 212. Such data could be media signals and or other data, such as programming information, or other data capable of being stored and or displayed to the user. Network interface 212 may comprise, for example, an Ethernet interface, an IEEE-1394 interface, a USB (Universal Serial Bus) interface, a serial interface, a parallel interface, a wireless radio frequency (RF) interface, a telephone line interface, a power line interface, a coaxial cable interface, and/or an infrared (IR) interface, among others.

Memory 214, which may include volatile and/or non-volatile memory, can store one or more programmed software applications, herein referred to as applications, which contain instructions that may be executed by processor 206 under the direction of operating system 216. Input data used by an application can be stored in memory 214 and read by processor 206 as needed during the course of the application's execution. This input data may be data stored in memory 214 by a secondary application or other source, either internal or external to DVR 102, or may be data that was created with the application at the time it was generated as a software application program. Other logic may also be stored in memory 212 for operation of the DVR 102.

Internal storage 218 may comprise a recordable medium and may be a number of devices available for non-volatile data storage, such as, among others, a hard disk drive (HDD), optical drive, or flash memory, for example. Although depicted as separate components, internal storage 218 and memory 214 could even be the same device. Internal storage 218 may be used for storing media data, such as encoded media signals received through communication interface 202 and/or network interface 212. It should be understood that media content can be digitally encoded before being stored on recordable medium by the DVR itself or by means external from the DVR, such as the media signal source or a cable set-top box. Media content may be stored on the recordable medium in an encrypted or unencrypted state.

Like internal storage 218, external storage 220 may also comprise a recordable medium and may be a number of devices available for non-volatile data storage, such as, among others, a hard disk drive (HDD), optical drive, or flash memory, for example. However, unlike internal storage 218, which is located within the DVR enclosure (i.e. housing) 219, external storage 220 can be removably attached to DVR 102 through a high-speed interface, such as high-speed communication bus 222.

External storage 220 could even be located remotely from the DVR, such as in other rooms or locations within a house. In some instances, external storage 220 can be removably attached to DVR 102 through a wireless connection.

Although only one external storage device may be used in some embodiments, it is contemplated that external storage 220 may comprise a plurality of storage devices 220a-220n. For example, devices 220a-220n could be a plurality of HDDs. It can be appreciated that the one or more HDDs could be provided with an equal number of high-speed communication buses 222, could be daisy chained, or could otherwise be combined to communicate with DVR 102 over one or more communication interfaces using a hub or other similar device.

High-speed communication bus 222 could be a bus operating under the Advanced Technology Attachment (ATA) standard, and more specifically, the Serial-ATA (i.e. SATA) standard version 2.5, which is available from the Serial ATA International Organization and is hereby incorporated by reference in its entirety. According to such an embodiment, DVR 102 may include a communications interface comprising an attachment port on the housing 219 of the DVR that cooperatively mates with the plug of external storage 220. A cable complying with the high-speed bus (i.e. a cable complying with the SATA standards) may provide the transmission medium between external storage 220 and the DVR 102. According to other embodiments, high-speed communication bus 222 could be a bus complying with the IEEE 1394 (Firewire) or the Universal Serial Bus (USB) standards, among others.

Regardless of the specific standard used by high-speed communication bus 222, or another communications interface, it can be advantageous for the communications interface to be capable of providing a medium for the transmission of media signals to be stored on the external storage 220 in real-time. In addition, the communications interface may also provide a medium for the transmission of any other data used to operate DVR, which may be communicated at the same time that media data is being recorded by external storage 220. Such other data could be, for example, data requested for playback of programming stored on the external device.

According to some embodiments, the external storage 220 may be provided in a self-supporting, external housing. For example, the housing may include an integrated power supply for powering to the external storage, and may also provide cooling devices, such as fans and/or heat dissipating devices.

According to some embodiments, DVR 102 may include a communications interface comprising a slot or port for readily removable media. The readily removable media could be flash memory, an HDD, optical media, or magnetic media, among others. The slot or port can be used for inserting and/or removing the device, which may be physically located internal or external to the housing of the DVR. Thus, depending on a selected embodiment, readily removable media could comprise internal storage 218 or external storage 220.

User input received during the course of execution of any processes implemented by DVR 102 may be received from an input device (not shown) via input system 210, transmitted through the bus 200, at least temporarily stored within memory 214, and communicated to processor 206. Data generated by an application may be stored in memory 214 by processor 206 during the course of the application's execution. Availability, location, and amount of data generated by one application for consumption by another application can be communicated by messages through the services of operating system 224, among others. Hence, preferences for the operation of the DVR functions can be input by, among others, a subscriber using an infrared remote and/or remotely under the control of an entity other than the user (e.g. by a command or other configuration change transmitted from the cable head-end). Changes to decision-making logic associated with the applications described herein can be made by a variety of mechanisms under software control.

A navigator application 226 provides a navigation framework for services provided by DVR 102. Navigator 218 registers for, and in some cases reserves, certain user inputs related to navigational keys such as channel increment/decrement, last channel, favorite channel, etc. Navigator 218 also provides users with television (or other programming) related menu options that correspond to DVR functions such as, for example, providing an interactive program guide, blocking a channel or a group of channels from being displayed in a channel menu, recording particular channels, playback of recorded shows, etc.

Under user instruction, DVR application 228 can perform the general tasks of recording and/or and playing back received programs. DVR application 228 can include priority logic 230 for determining the location to store media data (e.g. when recording television programming or when buffering live television). For example, in the case that the DVR 102 includes both internal storage 218 and external storage 220, priority logic 230 can define a priority scheme which may comprise sets of rules for directing the media data either to internal or to external storage. Depending on the priority logic 230 used, a selected storage location preference (i.e. internal or external device) can be set while potentially allowing a fallback to an alternate storage location based on the sets of rules. A number of embodiments describing the potential embodiments of priority logic 230 will be described in detail below.

Applications, such as navigator 226 and DVR application 228, can utilize services provided by window manager 232 and/or other graphics utilities provided by operating system 224 to draw dialog boxes, menus, graphics, etc. for display on playback device 106. Window manager 232, which in one embodiment is part of operating system 224, contains functionality for allocating screen areas and managing screen use among the various applications. Accordingly, window manager 232 can provide the user interface for the DVR. Accordingly, window manager 232 may, for example, be directed by DVR application 228 to display information regarding the selection and/or input related to the sets of rules that comprise priority logic.

The applications executed by DVR 102 can comprise executable instructions for implementing logical functions. The applications can be embodied in any computer-readable medium for use by or in connection with an instruction execution system. The instruction execution system may be, for example, a computer-based system, a processor-containing system, or any other system capable of executing or interpreting instructions. In the context of this document, a "computer-readable medium" can be any means that can contain, store, communicate, propagate, or transport the program for use by or in connection with the instruction execution system, apparatus, or device.

The computer-readable medium can be, for example, but is not limited to, an electronic, solid-state, magnetic, optical, electromagnetic, infrared, or semiconductor system, apparatus, device, or propagation medium, either internal to DVR 102 or externally connected to the DVR 102 via one or more communication ports or network interfaces. More specific examples (a non-exhaustive list) of the computer-readable medium would include the following: an electrical connection (electronic) having one or more wires, a portable computer diskette (magnetic), a hard drive storage device (magnetic), a random access memory (RAM) (solid-state device), a read-only memory (ROM) (solid-state device), an erasable programmable read-only memory (EPROM or Flash memory) (multiple devices), an optical fiber (optical), and a portable compact disc read-only memory (CDROM) (optical). Note that the computer-readable medium could even be paper or another suitable medium upon which the program is printed, as the program can be electronically captured, via for instance optical scanning of the paper or other medium, then compiled, interpreted or otherwise processed in a suitable manner if necessary, and then stored in a computer memory.

Figure 3:
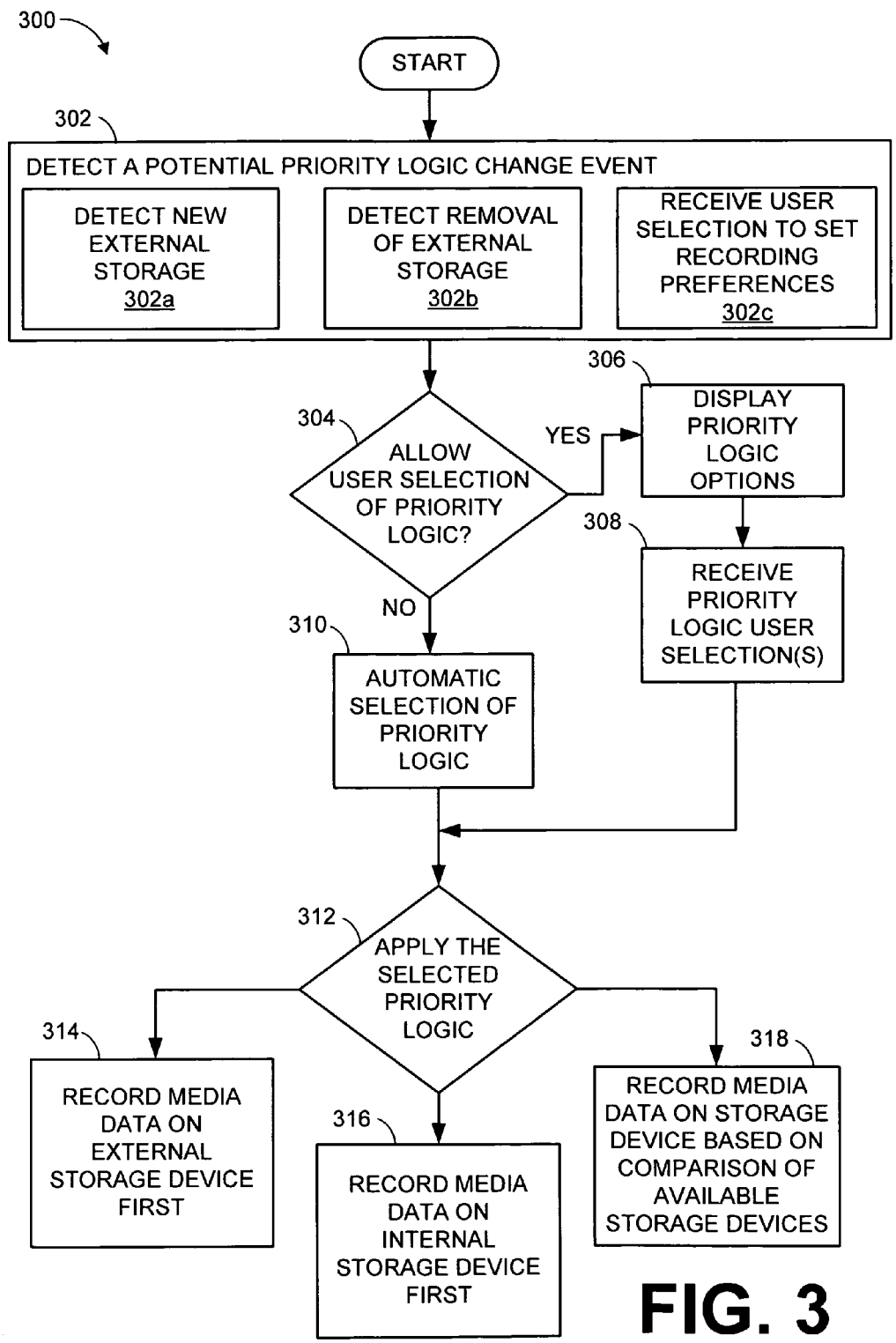
FIG. 3 depicts a flow diagram illustrating an embodiment of a method for selecting the priority logic used for prioritizing the storage location of media data that may be implemented by the DVR of FIG. 2.

FIG. 3 is a flow diagram illustrating a method embodiment 300 that can be used for selecting a set of one or more logical rules that determines the physical and/or logical location to store media data when DVR application 228 records television programming and/or buffers live television. In other words, method embodiment 300 can be used for setting the priority logic 230 of FIG. 2.

For example, as briefly described above, in the case that the DVR 102 includes both internal storage device 218 and external storage device 220, the priority logic 230 can, for example, define whether to prioritize the recording of media data onto one or more external storage devices, prioritize the recording of media data onto one or more internal storage devices, or record media data on the storage devices (i.e. internal or external) based on a comparison of the internal and external storage device characteristics, among other considerations.

According to some embodiments, the priority logic related to the storage location of a time-shift buffer may be set independently of, for example, the storage location of scheduled recordings. Specifically, in terms of digital media devices, a time-shift buffer may be known as the storage space allocated on a storage device for recording real-time media signals (e.g. on a currently selected channel) allowing a user to pause and rewind during real-time playback of the signals. Accordingly, the priority logic related to the storage location of the media data in the time-shift buffer may include different logical rules from the rules applied to media data related to, for example, scheduled programs.

According to some embodiments, the logical rules making up the selected priority logic may be predetermined and non-configurable. Such a configuration may appeal to manufacturers who are minimizing complexity or wish to maintain control over the usage of their equipment. However, in the case that such flexibility is afforded, whether by user selection or automatic selection, the flow diagram of method embodiment 300 describes an exemplary process for providing the capability of selecting the desired logical rules.

At block 302, DVR application 228 may detect a potential priority logic change event. A priority logic change event may, for example, be an indication that the priority logic should be checked and potentially updated.

For example, one event indicating that the priority logic may be updated is the addition of a new external storage device. For example, if no external storage devices are currently used, the priority logic may be changed to incorporate the use of the external device. Accordingly, at block 302a, a new external storage device can be detected. For example, such detection can be performed by operating system 224, and operating system 224 can provide a signal to DVR application 226, that a newly connected external storage device has been detected.

Similarly, block 302b represents that the detection of the removal of at least one external storage device could also trigger an indication that revised priority logic may be needed. In fact, if no external devices remain available, the priority logic 230 may be configured to direct all media data to internal storage.

As yet another example of a potential priority logic change event, block 302c represents the detection of a requested user selection of priority logic. For example, DVR application 228, through window manager 232 and/or navigator 226, may provide such user selection capabilities through one ore more menu-driven user interfaces.

Accordingly, one will appreciate that the above change events are merely examples, and a number of other potential priority change events including, but not limited to, the set-up and initialization of the DVR 102, a detection of the used capacity of one or more storage devices, the relative usage of one or more storage devices, the temperature of the one or more storage devices, reliability measures of the storage devices, etc.

As indicated above, some embodiments of DVR application 228 may be configured to allow a user selection of the rules that define the priority logic, while other embodiments may be configured to respond to the priority change events automatically without allowing and/or requesting a user's input. The decision to allow or restrict a user selection of priority logic may also, for example, be configured to depend on the type of priority change event detected, the available storage devices, and/or the desired simplicity of the system, among others. It can be appreciated that some users may wish to have the option of controlling the storage location of media data, while other users would rather DVR 102 control all aspects for simplicity. Accordingly, such control may also be user configurable.

Accordingly, upon detecting that a priority change may be needed, at decision 304, the DVR application 228 can determine whether a user selection of priority logic is to be provided. If a user selection is not to be provided (the NO condition), the DVR application may automatically select appropriate recording logic at block 310. For, example, the priority logic to select may be predefined or determined based on predetermined logical rules. However, if a user selection is to be provided (the YES condition), at block 306 DVR application 228 can request that window manager 232 display a user interface that displays a number of options for selecting the desired rules to be used for the priority logic. Such options could range from providing limited control to detailed control over the priority logic, and may also provide the user with the option of independently selecting the priority logic related to the time-shift buffer. The options may vary depending on the available sets of rules capable of being implemented the priority logic, some examples of which are described below.

At block 308, user selections are received by window manager 228 (e.g. through input system 210). Once the user selections have been received, window manager 232 can supply the selections to priority logic 230 for use in applying the user selections to the recording logic used by DVR application 228.

At block 312, the selected priority logic can be applied, which may include storage in a location in memory 214 and/or a storage device. For example, at block 314 rules may be applied to for prioritizing the recording of media data on an external storage device. According to such priority logic, the DVR application 228 is configured to preferentially record media data on the external device before recording media data on the internal storage device. For example, the recording logic may specify that, so long as space is available on the external device, or could be made available through the deletion of other media data, the media data is to be recorded on external storage device 220. Logic can be used to determine whether particular media data can be deleted to make room for the recording on the designated storage device based on defined characteristics (e.g. if the media data is flagged as permanently stored, etc.). It can be appreciated that other logical exceptions could be used in determining whether to follow the preference of recording on the external drive first. For example, such exceptions could be based on whether the external drive is available for storage (e.g. connected and powered-up, etc.), the disc activity, error conditions, etc. In such embodiments, by default, the priority logic defines that media data is to be stored to the external device barring one or more exceptional conditions.

Similarly, at block 314 priority logic may be set for recording media data using internal storage 218. According to such priority logic, the DVR application 228 is configured to preferentially record on the internal device before using the external storage device for media storage. For example, the recording logic may specify that, so long as space is available, or could be made available through the deletion of other media data (e.g. media having defined characteristics), the media data is recorded on internal storage device 218. For example, such exceptions could be based on disc activity, the temperature within the enclosure, error conditions, whether other storage devices are available, etc. It can be appreciated that other logical exceptions could be used in determining whether to follow the preference of recording on the internal drive first. Nonetheless, in such embodiments, by default, the priority logic defines that media data is to be stored to the internal device barring one or more exceptional conditions.

Although the priority logic could be made to apply to all programming subject to the specified conditions, according to some embodiments, the priority logic could specify that media data is to be preferentially stored to a particular device based on the media programming itself. For example, the priority logic could be based upon attributes of the media programming such as, for example, the type of programming (i.e. sports, news, cartoons, children's shows, etc.) or program information (i.e. the title of the programming, the people or entities portrayed in the media programming, whether the media programming is first-run or a re-run, etc.).

According to some embodiments, such media attributes could be used to form exceptions to a general preference that media be stored to a particular device. For example, the priority logic can define that media data is to be stored to the internal device unless the programming has particular media attributes. In this case, the media data can be directed to the external storage device.

Similarly, at block 316, priority logic may be configured to select a storage location for the media data based on a comparison of properties associated with the available internal and/or external storage devices. For example, according to one embodiment, a comparison of the capacity of the various internal and/or external storage devices can be used. For example, the priority logic 230 can be configured to define that media data is to be preferentially stored to the storage device having the most available capacity at the time of recording (subject to any exceptions similar to those discussed with respect to blocks 314 and 316). Thus, if more recording space is available on the external drive, the media data is preferentially recorded on the external storage device 220. In the case that internal storage device has more storage space available, the recording logic may specify that the media data be preferentially recorded on the internal storage device 314. It can be appreciated that other logical determinations could be made to determine the preferred storage device based on a comparison of associated properties. For example, media data could be directed the storage device under less activity load (i.e. disc activity), to the device having a lower temperature, etc.

Once the rules defining the priority logic are selected, the priority logic may be, for example, stored for future use in non-volatile memory, such as internal storage 218, and accessed by DVR application 228 at a time when DVR application 228 receives an indication that media data is to be recorded, e.g. buffering live television, recording scheduled programming, etc.

Each of the various recording logic schemes have respective advantages that can be exploited by the user and/or manufacturer of the DVR. For example, priority logic used for preferentially recording media data on an external storage device, before using the internal device, can be advantageous for a number of discovered reasons. For example, it can be advantageous to direct the majority of wear and tear to the storage device that is the easiest to replace. As mentioned above, external storage device 220 can be configured to be easily detached and replaced. In contrast, internal device 218 can be relatively difficult to replace for many users, and doing so may void warranties in place by the manufacturer. Accordingly, by shifting the wear and tear to an easily replaceable external storage device, the usable lifetime of the DVR 102 can be potentially extended.

Additionally, the recording and playback of media programs on some devices, such as HDDs, can cause the devices to increase their emission of heat, relative to the amount of heat emitted when not under load. When installed inside the enclosure of DVR 102, this heat can adversely affect the storage device itself, as well as other components inside of the DVR. To mitigate these effects, conventional DVRs may include fans to increase the air flow through the enclosure in order to cool the devices within the DVR. However, such fans can be noisy and are prone to failure. Accordingly, the heat buildup within the DVR enclosure can be mitigated by directing the playback and recording to an external storage device, thereby extending the lifetime of the DVR system components and reducing the need for auxiliary cooling.

In other situations, using priority logic defining that the media data be preferentially stored onto internal storage 218 can be advantageous. For example, users that wish to disconnect their external storage devices and still be able to playback much of the recorded media data may prefer that most recordings be stored on the internal device. Additionally, some external storage devices may include supplementary cooling (e.g. fans) that may increase in noise as the use of the storage device (and related heat emissions) increases. Accordingly, in an effort to reduce ambient noise, some users may prefer that the external storage device be used secondary to the internal storage.

Likewise, priority logic set to record media data based on a comparison of the properties associated with the available storage devices can be useful for simplicity or for exploiting associated drawbacks with the properties being compared. For example, storing media data to the device having less activity load may result in relatively better performance, while storing media data to the device having a lower temperature can potentially result in less errors and extend the life of the storage devices and components around the storage devices.

Figure 4:
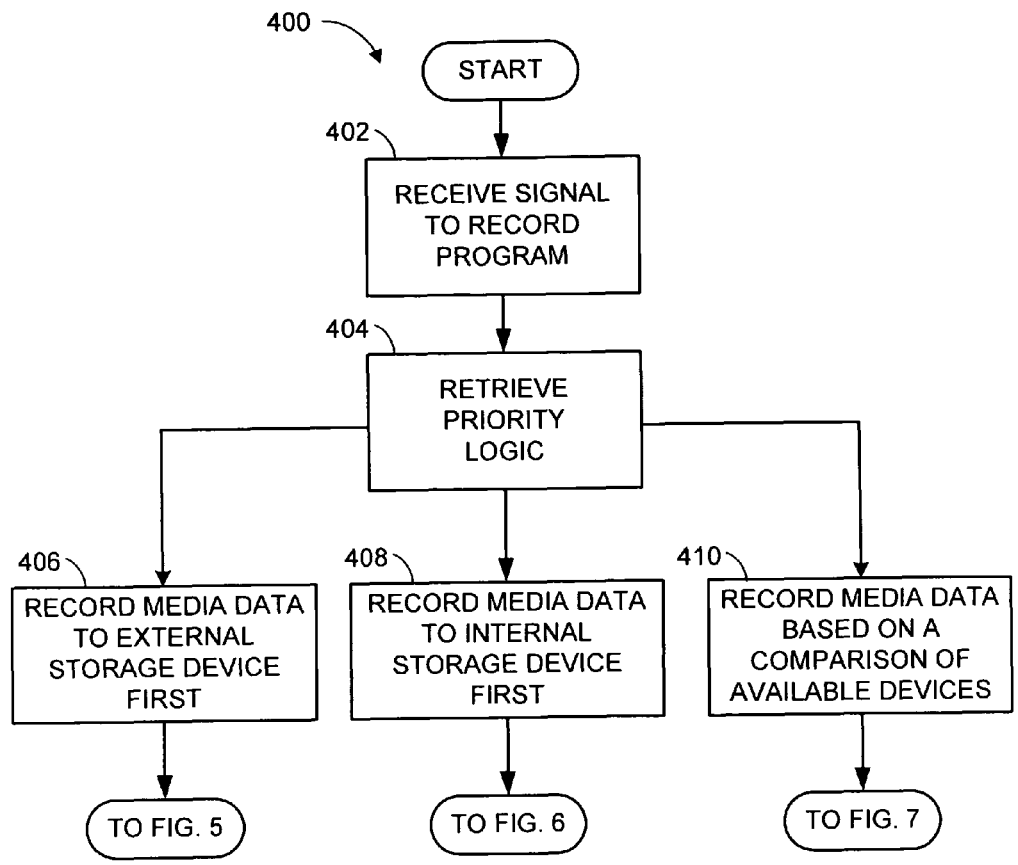
FIG. 4 depicts a flow diagram of an embodiment of a method for prioritizing the storage location of media data capable of being used by the DVR of FIG. 2.

Now that systems and methods for selecting the priority logic have been provided, further description of how DVR application 228 may use such priority logic is described in more detail. Specifically, FIG. 4 depicts an embodiment of a method 400 for using the priority logic. At block 402, DVR application 228 may receive a signal that media data is to be stored onto a storage device. For example, this signal may be an indication that media content is to be recorded or that a user has selected real-time programming (i.e. which may trigger the set-up of a time-shift buffer).

According to some embodiments, the indication that media content is to be recorded could be received as a result of a user instructing the DVR 102 to record a particular channel or could be the result of a previously scheduled recording being triggered automatically by the DVR application, among other reasons.

At block 404 the current priority logic can be retrieved from memory for use in determining the storage location for the media content. For example, the DVR application 228 can request that the currently applied recording logic be retrieved from internal storage 218 or from a location in memory 214. DVR application 228 then may then determine the storage device to store the media data to based on the loaded recording logic. According to some embodiments, a priority logic process distinct from DVR application 228 can be used to control the storage and retrieval of priority logic from memory and communicate the priority logic to DVR application 228.

Figure 5:
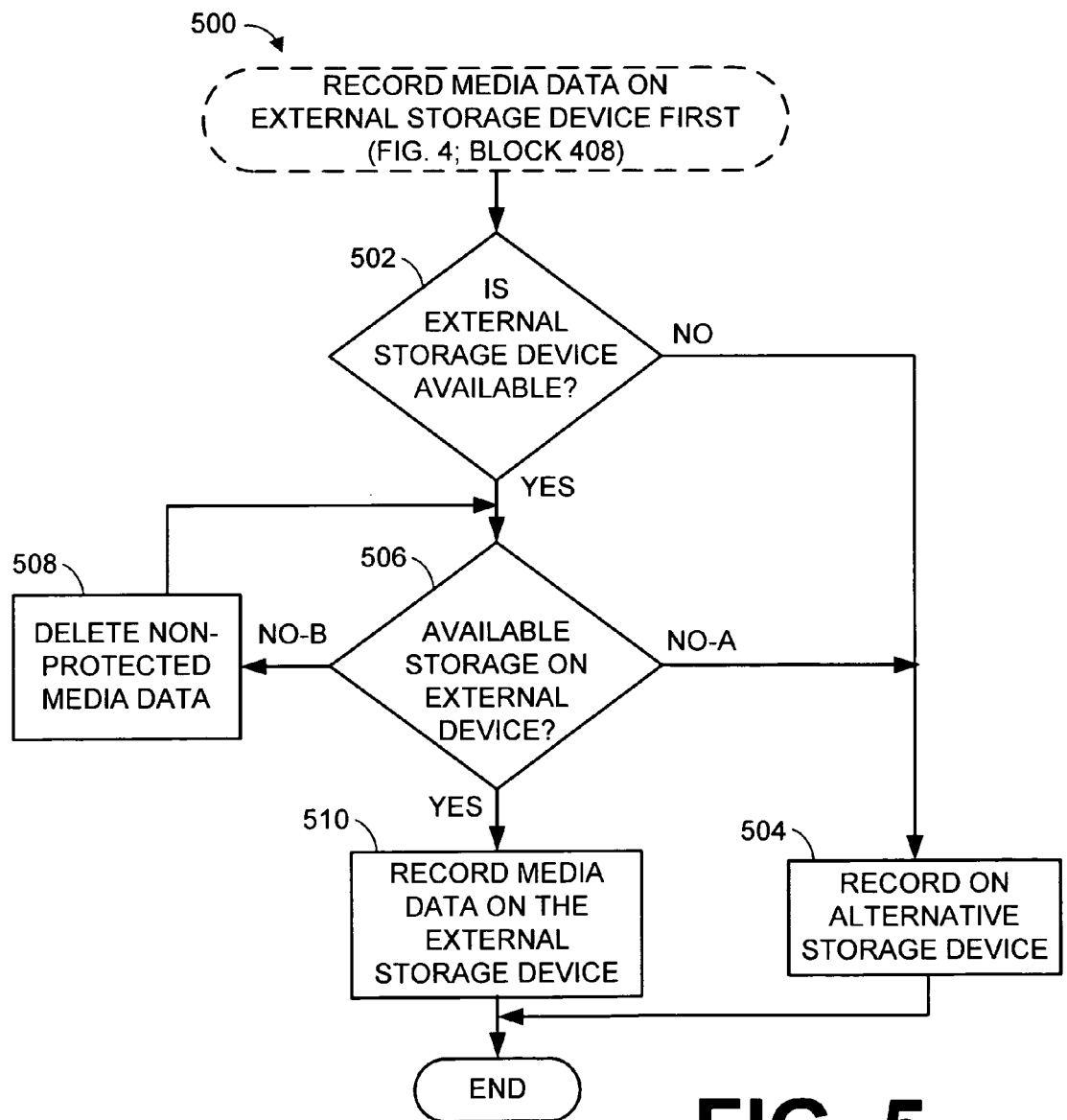
FIG. 5 depicts a flow diagram of an embodiment of a method for prioritizing the storage location of media data to the external storage of the DVR of FIG. 2.

For example, at block 406, if the priority logic indicates that data is to be prioritized to the external storage device the process depicted in FIG. 5 may be carried out. Similarly, at block 408, if the priority logic indicates that media data is to be preferentially recorded to the internal storage device, the blocks depicted in FIG. 6 may be carried out. Further, at block 410, if the priority logic indicates that data is to be recorded based on a comparison of available devices, the blocks depicted in FIG. 7 may be carried out.

Accordingly, FIG. 5 depicts an embodiment of a process 500 that may be carried out by DVR application 228 if the priority logic indicates that media data is preferred to be recorded to an external storage device. At decision block 502, DVR application 228 may determine whether the desired external storage device is available for recording media data. For example, DVR application 228 may request such information from operating system 224, which can determine whether the external storage device is connected to DVR 102 and/or otherwise available to record media programs (e.g. whether the external storage device is powered, has no critical error conditions, etc.).

In the event that priority logic 230 determines that the external storage device is not available (the NO condition), priority logic 230 can select an alternate storage device for recording the media data at block 504. For example, priority logic 230 may select another external storage device (i.e. one of storage devices 220a-220n) or may default to using the internal storage device. Such a decision can be predetermined or, if available, the user may be requested to make the decision through input supplied through one or more dialog boxes generated by window manager 232.

However, in the event that the external storage device is available, at decision block 504, DVR application 228 may determine whether available storage space is available on the external storage device to record the media programming. Such storage space information can be determined, for example, by requesting the storage space information from operating system 224, which may return a value representing the amount of space available for data storage on the external storage device. The space available could, for example, be measured in bits, bytes, megabytes, or gigabytes. The space available can then be compared to the amount of media data associated with the recording.

In the case of scheduled media programming, the amount of media data associated with the recording may be determinable based on, among other variables, the resolution, frame rate, bit rate, and the length of the scheduled recording. In some cases, this determination may be an estimation of the actual space needed (e.g. due to variable compression of the underlying media signal) and/or could be a predetermined fixed size estimation for the duration needed (e.g. 1500 MB for each hour of MPEG-2 encoded media data).

Similarly, in the case that the media data to be recorded will fill a time shift buffer, the buffer size may be predetermined based on the amount of buffering afforded by the DVR application 228. In some cases, this amount may be equal to the amount of available space on a selected storage device. That is, DVR application 228 may use all available storage space to potentially buffer television being viewed in real-time. In this case, for the purposes of determining whether the external device has the storage capacity available for recording, it may be beneficial to predetermine a minimum amount of storage space on the external device for the time-shift buffer.

However, according to other embodiments, the size of the time-shift buffer may be predetermined. For example, DVR application may limit the time shift buffer to a maximum of 30 minutes of buffering and/or by limiting the time shift buffer to a maximum media data storage capacity (e.g. 800 MB). Regardless of how the amount of media data to be stored is determined, the total available capacity of the external storage device can be compared to the amount determined to be needed for the storage of the media data.

In the case that the external device does not have enough available storage space to store the media data (the NO-A or NO-B conditions), some embodiments may skip directly to block 504 (the NO-A condition) to determine an alternate storage device on which to record the programming, as explained above. However, according to some embodiments, at block 508 (the NO-B condition), any media data that is not protected from deletion can be deleted to free available recording space on the external storage device. That is, according to some DVR embodiments, the DVR may be configured to automatically delete media data according to predetermined sets of rules. For example, one set of rules may specify that programming may be protected for a predetermined number of days before becoming eligible for deletion. According to other rule embodiments, a predetermined number of recorded episodes may be retained, and once this predetermined number is reached the oldest retained episode can be deleted to make room for the recording of the most recent episode. One skilled in the art can envision a number of similar rules for protecting and un-protecting media files with respect to eligibility for automatic deletion. According to some embodiments, only enough space is deleted to cause the external storage device to have enough room for recording the desired media data.

Once non-protected media has been deleted, if any, the check for available storage space at block 506 can be performed again. If the space available on the external device is still not enough, block 504 (the NO-A condition) can be executed to determine an alternate storage device upon which to record the media data.

However, in the case that available storage is available on the external device (the YES condition), at block 510 the media data is recorded to the external storage device. Once recorded to the external storage device, even in part, in some embodiments, the media data can be accessed for playback via DVR application 228.

Figure 6:
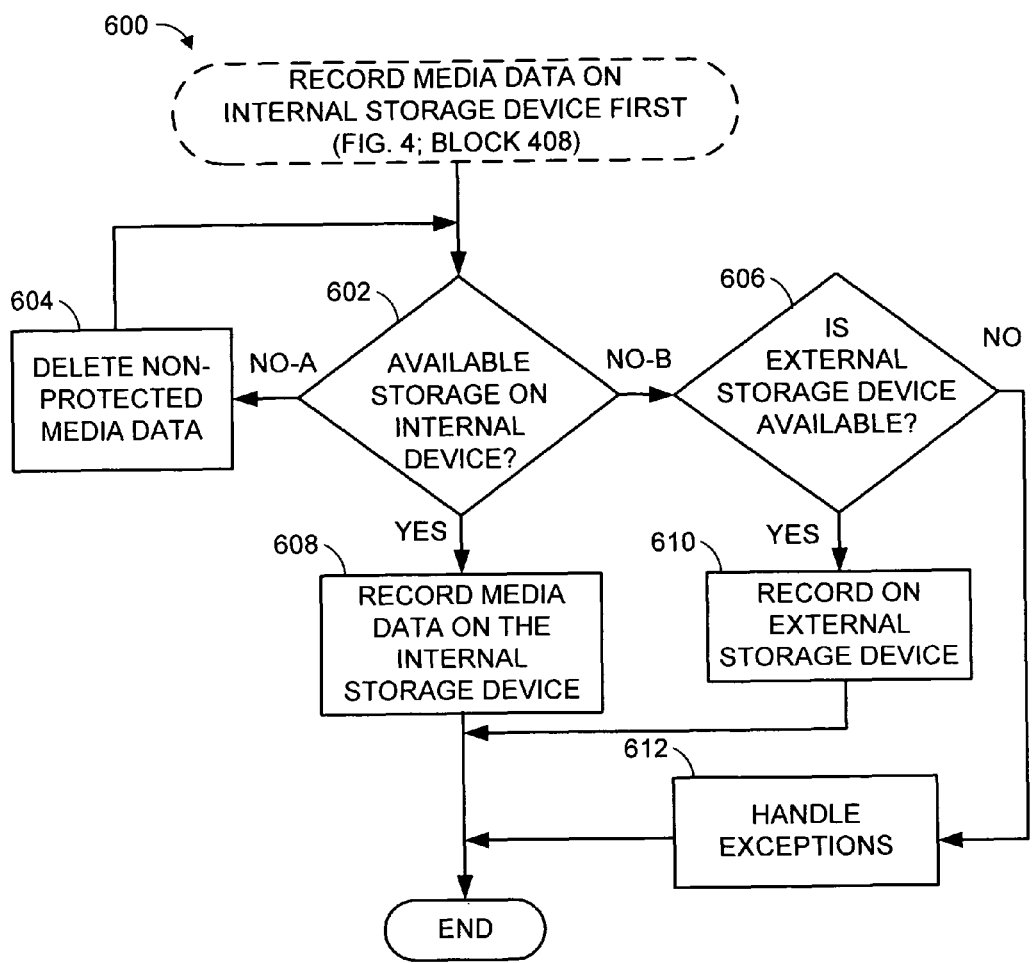
FIG. 6 depicts a flow diagram of an embodiment of a method for prioritizing the storage location of media data to the internal storage of the DVR of FIG. 2.

Now looking to FIG. 6, an embodiment of a process 600 that may be carried out if the recording logic indicates that data is preferred to be recorded to an internal storage device. At decision block 602 priority logic 230 may determine whether storage space is available on the internal storage device to record the media programming. Such information can be determined, for example, in a similar manner as explained with respect to method 500.

In the case that the internal storage device does not have enough available storage space to store the media data (the NO-A or NO-B conditions), according to some embodiments, at block 604 (the NO-A condition) any media data that is not protected from deletion can be deleted to free available recording space on the internal storage device in a similar manner as explained with respect to freeing non-protected data on an external storage device using method embodiment 500.

Once non-protected media has been deleted, if any, the check for available storage at block 602 can be repeated. In the case that available storage is available on the internal device (the YES condition of decision block 602), at block 608 the media is recorded to the internal storage device. Once recorded to the internal storage device, the media can be accessed for playback via DVR application 228.

However, if the space available on the internal device is still not enough, decision block 606 (the NO-B condition) can be executed to determine whether an alternate storage device is available to record the media data. For example, DVR application 228 may determine whether an external storage device is attached to the DVR 102 and is available for recording media data. According to some embodiments, blocks 502-506 of method 500 could be used to determine whether the external storage device is available, whether there is available storage on the external device, and/or whether any non-protected data on the external device can be deleted in order to allow space for the media data to be recorded.

At block 610, if space is available on an external storage device (the YES condition), the media data is recorded to the external storage device. However, if space is not available on the external storage device (the NO condition), block 612 can be executed to handle the exception that no storage device is available for recording the programming. These exceptions can be handled through the automatic deletion of programming, an error displayed to the user, and/or a request for the user to delete programming from the internal and/or external storage device, for example.

Figure 7:
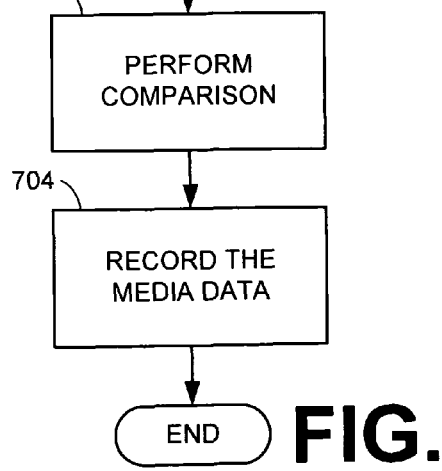
FIG. 7 depicts a flow diagram of an embodiment of a method for selecting the storage location of media data based on a comparison of the characteristics of the available storage devices of the DVR of FIG. 2.

Looking now to FIG. 7, an embodiment of a method 700 that may be carried out if the priority logic indicates that data is preferred to be recorded based on a comparison of the available storage devices as discussed above. For example, at block 702, one or more selected comparisons may be performed to determine the selected storage device. Upon determining the storage device to use, the media data can be recorded to this storage device at block 704.

Any process descriptions, steps, or blocks in the flow diagrams described herein and/or depicted in the attached figures should be understood as potentially representing modules, segments, or portions of code which include one or more executable instructions for implementing specific logical functions or steps in the process. Alternate implementations are included within the scope of the preferred embodiments of the systems and methods described herein in which steps or functions may be deleted, executed out of order from that shown or discussed, including substantially concurrently or in reverse order, depending on the functionality involved, as would be understood by those reasonably skilled in the art.

It should be emphasized that many variations and modifications may be made to the above-described embodiments. All such modifications and variations are intended to be included herein within the scope of this disclosure and protected by the following claims.

At leaset the following is claimed:

1. A method comprising:
   receiving an indication that a media program is to be recorded;
   receiving a user selection of a plurality of logical rules to be applied for storage of the media program, wherein the user selection is limited only to all available logical rules based on the detection of a priority change event, wherein receiving the user selection limited to the subset of all available logical rules comprises receiving, via a window manager configured to provide the available logical rules based on the detected priority change event;
   selecting, from the window manager, one of a plurality of media data storage locations associated with a digital media recorder based on logical rules that prioritize the storage of media data to one of the plurality of storage locations over the other potential storage locations, wherein at least one logical rule compares the relative usage of the plurality of media data storage locations; and
   storing media data representing the media program to the selected media data storage location.

2. The method of claim 1, wherein the step of selecting one of a plurality of media data storage locations comprises: selecting the media data storage location based on logical rules that prioritize the storage of the media data between a first storage device and a second storage device, the first storage device located internal to an enclosure of the digital media recorder and the second storage device being removably attachable to the enclosure of the digital media recorder.

3. The method of claim 2, wherein the step of selecting the media data storage location includes prioritizing the storage of the media data to the second storage device over the first storage device.

4. The method of claim 3, wherein the step of storing media data representing the media program further comprises: storing media data representing the media program to the second storage device unless an exception to storing the media data to the second storage device applies.

5. The method of claim 4, further comprising: storing the media data to the first storage device in the event that the exception to storing the media data to the second storage device applies.

6. The method of claim 3, further comprising:
   determining whether the second storage device has available storage for storing the media data; and
   storing the media data to the first storage device in the event that the second storage device does not have available storage for storing the media data.

7. The method of claim 3, further comprising:
   determining whether the second storage device is available for storing the media data; and
   storing the media data to the first storage device in the event that the second storage device is not available for storing the media data.

8. The method of claim 2, wherein the step of selecting the media data storage location includes prioritizing the storage of the media data to the first storage device located internal to the enclosure over the second storage device.

9. The method of claim 1, further comprising:
   detecting a potential priority logic change event; and
   at a time after detecting the potential priority logic change event, selecting the logical rules that prioritize the storage of the media data to one of the plurality of potential media data storage locations.

10. The method of claim 9, further comprising: displaying options for configuring the logical rules within a graphical user interface; and receiving a user selection from the displayed options, the user selection indicating the logical rules to be applied to prioritize the storage of the media data to one of the plurality of potential storage locations.

11. The method of claim 1, wherein the logical rules independently prioritize the storage location of media data in a time-shift buffer and the storage location of other media data.

12. The method of claim 1, wherein the step of selecting one of the plurality of media data storage locations comprises: selecting one of the plurality of media data storage locations based on an attribute of the media programming.

13. A digital media recorder comprising:
   a first storage device associated with the digital media recorder; and
   an interface for removably attaching a second storage device to the digital media recorder, each of the first and second storage devices configured to store media data representing programming from a media source, the digital media recorder configured with logic for prioritizing the storage of the media data to one of the first and second storage devices before storing the media data to the other of the first and second storage devices, wherein at least one logical rule in the logic compares the relative usage of the plurality of the first and second storage devices, wherein the at least one logical rule is received via a user selection of a plurality of logical rules to be applied for storage of the media data, wherein the user selection is limited only to all available logical rules based on the detection of a priority change event, wherein the available logical rules are provided by a window manager configured to provide the available logical rules based on the detected priority change event.

14. The digital media recorder of claim 13, wherein the logic for prioritizing the storage of the media data directs the digital media recorder to store media data on the second storage device unless an exception to storing the media data to the second storage device applies.

15. The digital media recorder of claim 14, wherein the first storage device is located internal to an enclosure of the digital media recorder and the second storage device is located external to the enclosure of the digital media recorder.

16. The digital media recorder of claim 13, wherein the logic for prioritizing the storage of the media data is configured with rules for determining which of the first and second storage devices to store media data associated with scheduled programming.

17. The digital media recorder of claim 16, wherein the logic for prioritizing the storage of the media data is further configured with rules for determining which of the first and second storage devices to store media data within a time-shift buffer, the rules being independent of the rules for determining which of the first and second storage devices to store media data associated with scheduled programming.

18. The digital media recorder of claim 16, wherein the rules for determining which of the first and second storage devices to store media data associated with scheduled programming are based upon an attribute of the media programming.

19. The digital media recorder of claim 13, further comprising: logic configured to detect a potential priority logic change event; and logic configured, at a time after detecting the potential priority logic change event, to select the logical rules that prioritize the storage of the media data to one of the plurality of potential storage devices.

20. The digital media recorder of claim 19, comprising:
logic configured to display options for configuring the logical rules within a graphical user interface; and
logic configured to receive a user selection from the displayed options, the user selection indicating the logical rules to be applied to prioritize the storage of the media data to one of the plurality of potential storage locations.

21. A digital media recorder comprising:
means for receiving an indication that a media program is to be recorded;
means for receiving user selection of a plurality of logical rules to be applied for storage of the media program, wherein user selection is limited to a subset of all available logical rules based on the detection of a priority change event, wherein the means for receiving the user selection limited to the subset of all available logical rules comprises a window manager configured to provide the available logical rules based on the detected priority change event;
means for selecting one of a plurality of media data storage locations associated with a digital media recorder based on logical rules that prioritize the storage of media data to one of the plurality of storage locations over the other potential storage locations, wherein the means for selecting the one of the plurality of media data storage locations comprises the window manager, wherein at least one logical rule compares the relative usage of the plurality of media data storage locations; and
means for storing media data representing the media program to the selected media data storage location.

22. The digital media recorder of claim 21, wherein the means for selecting one of a plurality of media data storage locations comprises: means for selecting the media data storage location based on logical rules that prioritize the storage of the media data between a first storage device and a second storage device, the first storage device located internal to an enclosure of the digital media recorder and the second storage device being removably attachable to the enclosure of the digital media recorder.

23. The digital media recorder of claim 22, wherein the means for selecting the media data storage location includes: means for prioritizing the storage of the media data to the second storage device over the first storage device.

24. The digital media recorder of claim 23, wherein the means for storing media data representing the media program further comprises: means for storing media data representing the media program to the second storage device unless an exception to storing the media data to the second storage device applies.

25. The digital media recorder of claim 23, further comprising:
means for storing media data to the first storage device in the event that the exception to storing the media data to the second storage device applies.

26. The digital media recorder of claim 22, wherein the means for selecting the media data storage location includes means for prioritizing the storage of the media data to the first storage device located internal to the enclosure over the second storage device.

27. The digital media recorder of claim 21, further comprising:
means for detecting a potential priority logic change event; and means, at a time after detecting the potential priority logic change event, for selecting the logical rules that prioritize the storage of the media data to one of the plurality of potential media data storage locations.

28. The digital media recorder of claim 21, further comprising:
means for independently prioritizing the storage location of media data in a time-shift buffer and the storage location of other media data.

29. The digital media recorder of claim 21, wherein the means for selecting one of the plurality of media data storage locations comprises: means for selecting one of the plurality of media data storage locations based upon an attribute of the media programming.

* * * * *